US006487206B1

(12) United States Patent
Baruch et al.

(10) Patent No.: US 6,487,206 B1
(45) Date of Patent: Nov. 26, 2002

(54) METHOD AND APPARATUS FOR ADJUSTING THE LOCAL SERVICE POLICY WITHIN AN ATM SWITCH BASED ON NON-ATM PROTOCOL SERVICE PARAMETERS

(75) Inventors: Eli Baruch, Zur-Igal (IL); Offer Pazy, Tel-Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/316,978

(22) Filed: May 24, 1999

(51) Int. Cl.$^7$ ................................................ H04L 12/56
(52) U.S. Cl. .............................. 370/395.1; 370/395.21; 370/395.3; 370/395.43
(58) Field of Search ...................... 370/395.1, 395.21, 370/395.3, 395.43, 395.55, 395.6, 395.52, 395.53, 395.5, 465, 466, 397, 399, 467, 469

(56) References Cited

U.S. PATENT DOCUMENTS

| 5,604,743 | A | * | 2/1997 | Le Guigner et al. | ........ | 370/392 |
| 5,764,645 | A | * | 6/1998 | Bernet et al. | ................ | 370/466 |
| 5,870,629 | A | | 2/1999 | Borden et al. | | |
| 5,892,763 | A | * | 4/1999 | Laraqui et al. | .............. | 370/395 |
| 5,903,559 | A | * | 5/1999 | Acharya et al. | ............ | 370/355 |
| 6,041,054 | A | * | 3/2000 | Westberg | ..................... | 370/389 |
| 6,137,799 | A | * | 10/2000 | Karapetkov et al. | ........ | 370/395 |
| 6,172,980 | B1 | * | 1/2001 | Flanders et al. | ............ | 370/401 |
| 6,219,349 | B1 | * | 4/2001 | Kobayashi et al. | ......... | 370/395 |
| 6,275,494 | B1 | * | 8/2001 | Endo et al. | ................. | 370/395 |
| 6,343,083 | B1 | * | 1/2002 | Mendelson et al. | ......... | 370/466 |
| 6,377,574 | B1 | * | 4/2002 | Endo | ........................... | 370/359 |
| 6,381,216 | B1 | * | 4/2002 | Prasad | ..................... | 370/236.1 |

OTHER PUBLICATIONS

Williams, A. "MPOA: Routing Multiple Protocols over ATM", IP Routing Versus ATM Switching, pp. Nov. 2/1–2/5, Nov. 19, 1997, London, UK.*

Bavant, M. et al "IP Switch over ATM LAN Emulation". ATM, 1998, pp. 454–458, Jun. 22–24, 1998, Colmar, France.*

Ke, Huang et al "The Flow Detection Protocol Design in Multi–protocol over ATM" Communication Technology Proceedings, pp. 414–418, vol. 1, Oct. 22–24, 1998, Beijing, China.*

Shenoda, G. "Taking Advantage of ATM Technology in the LAN", Performance Communication Subsystems, pp. 0_61–0_68, Feb. 17–19, 1992.*

* cited by examiner

Primary Examiner—Hassan Kizou
Assistant Examiner—Anh-Vu H Ly
(74) Attorney, Agent, or Firm—McDonnell Boehnen Hulbert & Berghoff; Howard Zaretsky

(57) ABSTRACT

A method for adjusting an ATM switch local service policy based on a non-ATM protocol service parameter, the method including the steps of inspecting the payload of an ATM PDU received at a switch along at least one VCC to identify a non-ATM PDU protocol identifier included in the payload, inspecting the payload to identify a non-ATM PDU service identifier associated with the non-ATM PDU protocol identifier, and selectively adjusting a local service policy attribute within the switch for the at least one VCC based on the non-ATM PDU service identifier in accordance with an adjustment value previously associated with the non-ATM PDU protocol identifier and the non-ATM PDU service identifier.

14 Claims, 4 Drawing Sheets

METHOD AND APPARATUS FOR ADJUSTING THE LOCAL SERVICE POLICY WITHIN AN ATM SWITCH BASED ON NON-ATM PROTOCOL SERVICE PARAMETERS

FIELD OF THE INVENTION

The present invention relates to computer networks in general, and more particularly relates to methods and apparatus for adjusting the local service policy within an ATM switch based on non-ATM protocol service parameters.

BACKGROUND OF THE INVENTION

The increasing importance of Asynchronous Transfer Mode (ATM) network technologies and protocols has spawned efforts to allow non-ATM-based network applications and protocols to communicate via ATM networks. Two such efforts include the LAN Emulation (LANE) specification and the Multi-Protocol Over ATM (MPOA) specification, both of which allow non-ATM protocol data units (PDU), such as Ethernet frames and Internet Protocol (IP) packets that have been reformatted into ATM PDUs by the ATM Adaptation Layer (AAL), to be transmitted between non-ATM networks via an ATM network.

FIG. 1 is a simplified conceptual diagram of a prior art illustration of two non-ATM networks 10 and 12 communicating via an ATM network 14. Two ATM edge devices 16 and 18 are shown interfacing with a plurality of non-ATM endpoints, such as 20 and 22, and two ATM switches 24 and 26. A non-ATM PDU 28 sent by endpoint 20 and destined for endpoint 22 is received at edge device 16. Edge device 16 establishes a data direct virtual channel connection (VCC) 30 with edge device 18 via switches 24 and 26 in accordance protocols such as LANE or MPOA. Edge device 16 then reformats the non-ATM PDU 28 into ATM PDUs 32 at its AAL and transmits the ATM PDUs 32 via data direct VCC 30 to edge device 18 where they are reassembled into the non-ATM PDU 28 and transmitted to endpoint 22.

In accordance with the prior art an ATM endpoint typically establishes a "contract" specifying bandwidth and other quality of service (QoS) requirements when establishing a VCC. Once the VCC has been established, the contract is not renegotiated, and each ATM switch along the VCC must provide service within the boundaries set by the QoS contract. A switch's "local service policy" (LSP) as defined herein refers to the set of rules and mechanisms that a switch uses to service incoming and outgoing cells within these boundaries. The LSP determines, for example, the order in which the cell queues are emptied, weights for the buffers, and when to drop cells. While the LSP must always fulfill the QoS contract, the LSP may be dynamically changed to accommodate transient states as long as the overall QoS contract is maintained. Since multiple sources of non-ATM PDU data may share the same VCC, the bandwidth and QoS requested by edge device 18 and established for VCC 30 might be suitable for one type of non-ATM PDU data but not for another type of data since edge device 18 may be required to support several non-ATM PDUs, each representing a different type of data being communicated. This is true where a separate VCC is established to support a single non-ATM protocol, referred to as a non-multiplexed VCC, and especially true where a single VCC supports two or more non-ATM protocols, referred to as a link layer multiplexed (LCC) VCC.

The following publication is believed to be descriptive of the current state of the art of ATM technology and terms related thereto:

Kwok, T., "ATM: The New Paradigm for Internet, Intranet, and Residential Broadband Services and Applications," Prentice Hall, 1998.

The disclosures of all patents, patent applications, and other publications mentioned in this specification and of the patents, patent applications, and other publications cited therein are incorporated herein by reference in their entirety.

SUMMARY OF THE INVENTION

The present invention provides methods and apparatus for adjusting the local service policy within an ATM switch based on non-ATM protocol service parameters subsequent to a VCC being established.

There is thus provided in accordance with a preferred embodiment of the present invention a method for adjusting an ATM switch local service policy based on a non-ATM protocol service parameter, the method including the steps of a) inspecting the payload of an ATM PDU received at a switch along at least one VCC to identify a non-ATM PDU protocol identifier included in the payload, b) inspecting the payload to identify a non-ATM PDU service identifier associated with the non-ATM PDU protocol identifier, and c) selectively adjusting a local service policy attribute within the switch for the at least one VCC based on the non-ATM PDU service identifier in accordance with an adjustment value in predefined association with the non-ATM PDU protocol identifier and the non-ATM PDU service identifier.

Further in accordance with a preferred embodiment of the present invention the ATM PDU is an AAL PDU.

Still further in accordance with a preferred embodiment of the present invention the method further includes the step of d) identifying a first cell in the AAL PDU and thereafter performing steps a)–c).

Additionally in accordance with a preferred embodiment of the present invention the steps a)–d) are performed for at least two non-ATM PDUs on the VCC, tie non-ATM PDUs are of different protocol types.

Moreover in accordance with a preferred embodiment of the present invention the at least one VCC includes at least two VCCs, and the steps a)–d) are performed for at least one non-ATM PDU on each of the at least two VCCs.

Further in accordance with a preferred embodiment of the present invention the AAL PDU is of an AAL type selected from the group consisting of: type 1, type 2, type 3/4, and type.

Still further in accordance with a preferred embodiment of the present invention the method further includes maintaining a predefined association between a specific non-ATM PDU protocol identifier and the position of the non-ATM PDU service identifier in the payload.

There is also provided in accordance with a preferred embodiment of the present invention apparatus for adjusting an ATM switch local service policy based on a non-ATM protocol service parameter including means for inspecting the payload of an ATM PDU received at a switch along at least one VCC to identify a non-ATM PDU protocol identifier included in the payload, means for inspecting the payload to identify a non-ATM PDU service identifier associated with the non-ATM PDU protocol identifier, and means for selectively adjusting a local service policy attribute within the switch for the at least one VCC based on the non-ATM PDU service identifier in accordance with an adjustment value in predefined association with the non-ATM PDU protocol identifier and the non-ATM PDU service identifier.

Further in accordance with a preferred embodiment of the present invention the ATM PDU is an AAL PDU.

Still further in accordance with a preferred embodiment of the present invention the apparatus further includes means for identifying a first cell in the AAL PDU.

Additionally in accordance with a preferred embodiment of the present invention any of the means are adapted for use with at least two non-ATM PDUs on the VCC, the non-ATM PDUs are of different protocol types.

Moreover in accordance with a preferred embodiment of the present invention the at least one VCC includes at least two VCCs, and any of the means are adapted for use with at least one non-ATM PDU on each of the at least two VCCs.

Further in accordance with a preferred embodiment of the present invention the AAL PDU is of an AAL type selected from the group consisting of: type 1, type 2, type 3/4, and type.

Still further in accordance with a preferred embodiment of the present invention the apparatus further includes maintaining a predefined association between a specific non-ATM PDU protocol identifier and the position o the non-ATM PDU service identifier in the payload.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
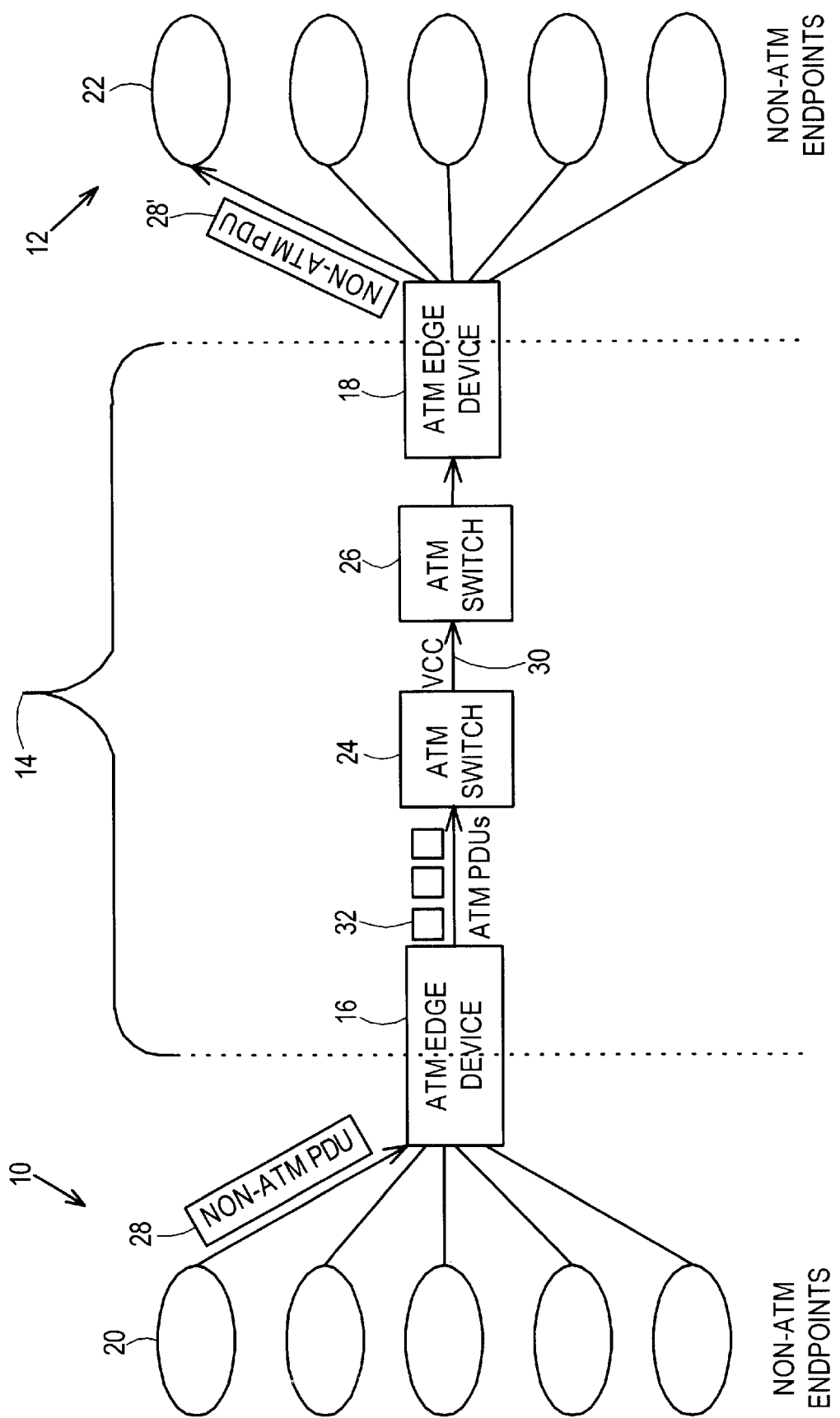
FIG. 1 is a simplified conceptual illustration of two non-ATM networks communicating via an ATM network as known in the prior art.
Figure 2:
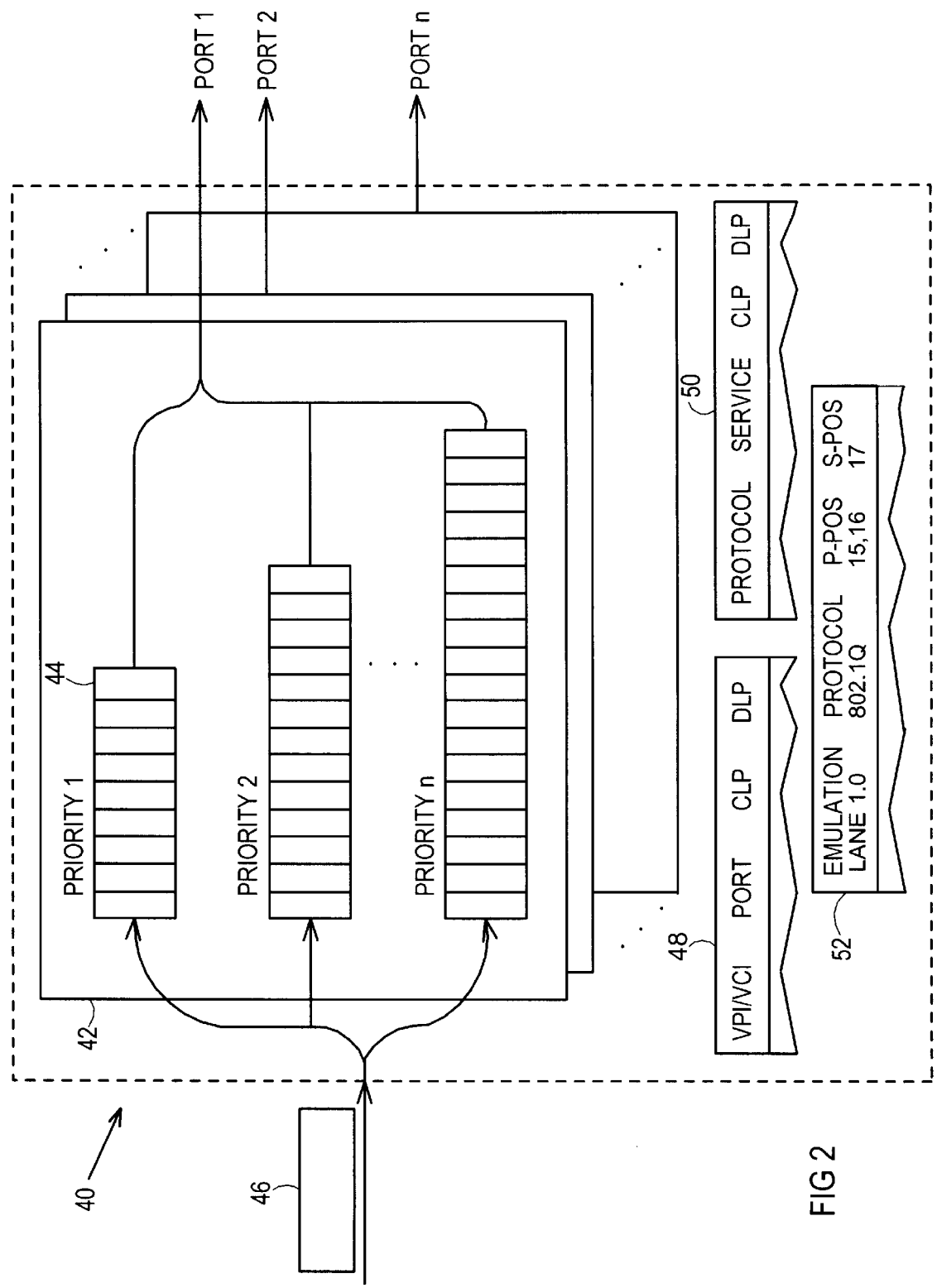
FIG. 2 is a simplified conceptual illustration of an ATM switch adapted for adjusting its local service policy based on a non-ATM protocol service parameter, constructed and operative in accordance with a preferred embodiment of the present invention.

Reference is now made to FIG. 2 which is a simplified conceptual illustration of an ATM switch adapted for adjusting its local service policy based on a non-ATM protocol service parameter, constructed and operative in accordance with a preferred embodiment of the present invention. An ATM switch, shown in dashed lines and generally designated 40, is shown typically comprising one or more queue groupings 42, with each grouping in turn comprising one or more queues 44. Each queue grouping 42 is typically designated for traffic that is destined to be output via a specific port. Each queue 44 in a particular queue grouping 42 is typically associated with a different priority level. A cell 46 that is input to switch 40 and destined to be output via a specific port of switch 40 is buffered into one of the queues 44 in that port's queue grouping 42 according to the priority switch 40 attributes to cell 46. When more than one queue 44 in a given queue grouping 42 is non-empty, cells from a higher priority queue are output via the port before cells from a lower priority queue.

Switch 40 typically comprises a local service policy table 48 indexed by the VPI/VCI and port addresses of each VCC established. Table 48 also comprises the cell loss priority (CLP) override value, as well as a delay priority (DLP) value, both of which may be used to determine which queue 44 is to receive the cells for a particular VCC, as described in more detail hereinbelow with particular reference to FIG. 3. The CLP and DLP attribute fields in table 48 typically have default values that are initialized during VCC setup based on the negotiated QoS contract. In addition to table 48, switch 40 also typically comprises a protocol service table 50 which includes the desired CLP override and DLP values associated with each non-ATM protocol identifier and protocol service identifier which are used to dynamically override the attribute fields in table 48. The term "protocol service identifier" as used herein denotes a non-ATM-protocol-specific value stored within a non-ATM frame that indicates a desired service level, such as a priority. Switch 40 also typically includes a frame parsing table 52 which includes the locations within an ATM PDU where a non-ATM protocol identifier and service identifier may be found for each non-ATM protocol frame and non-ATM-to-ATM protocol. Note also that switch 40 is AAL-frame aware as well.

Figure 3:
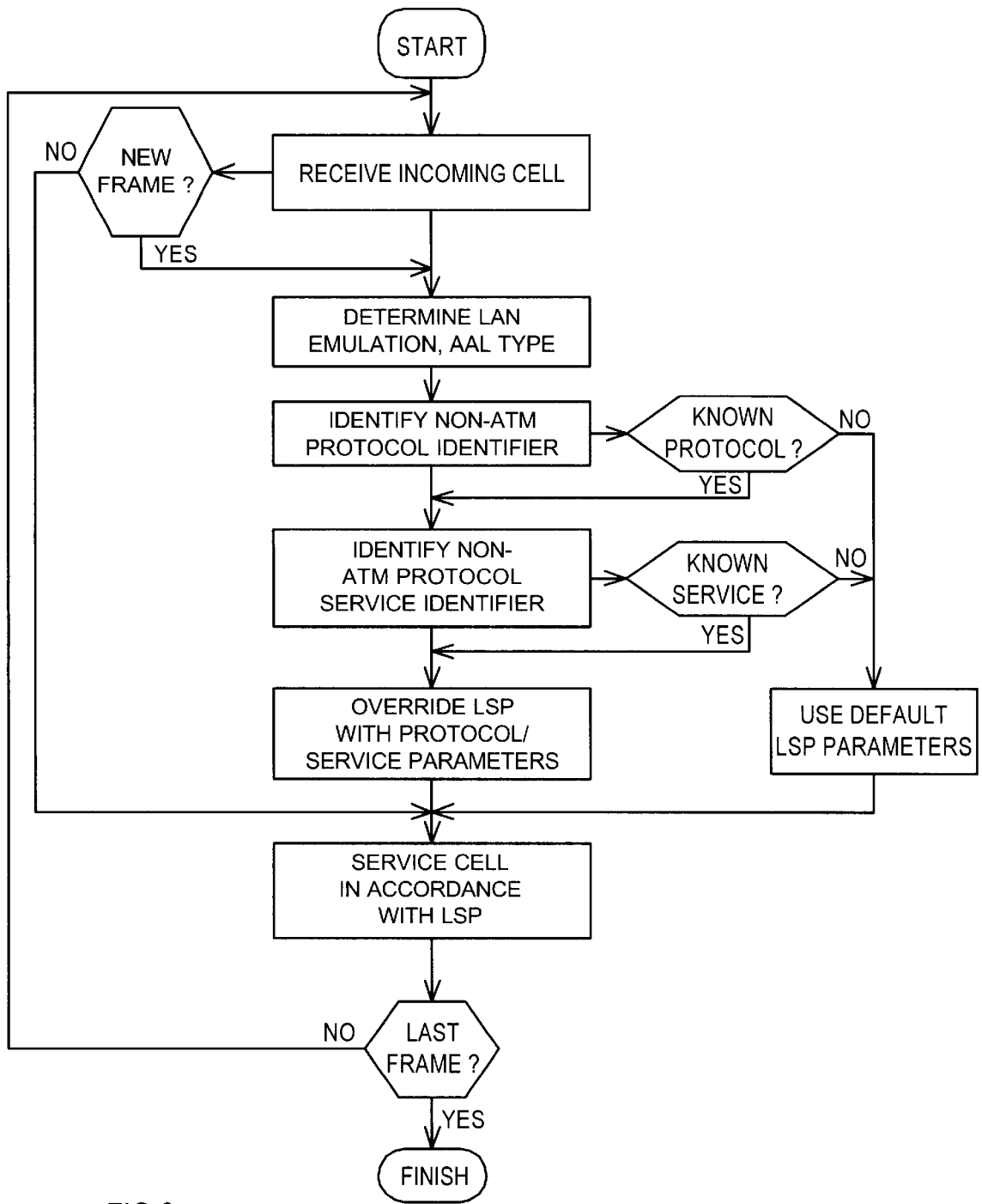
FIG. 3 is a simplified flowchart illustration of a method of operation of the ATM switch of FIG. 2, operative in accordance with a preferred embodiment of the present invention.
Figure 4:
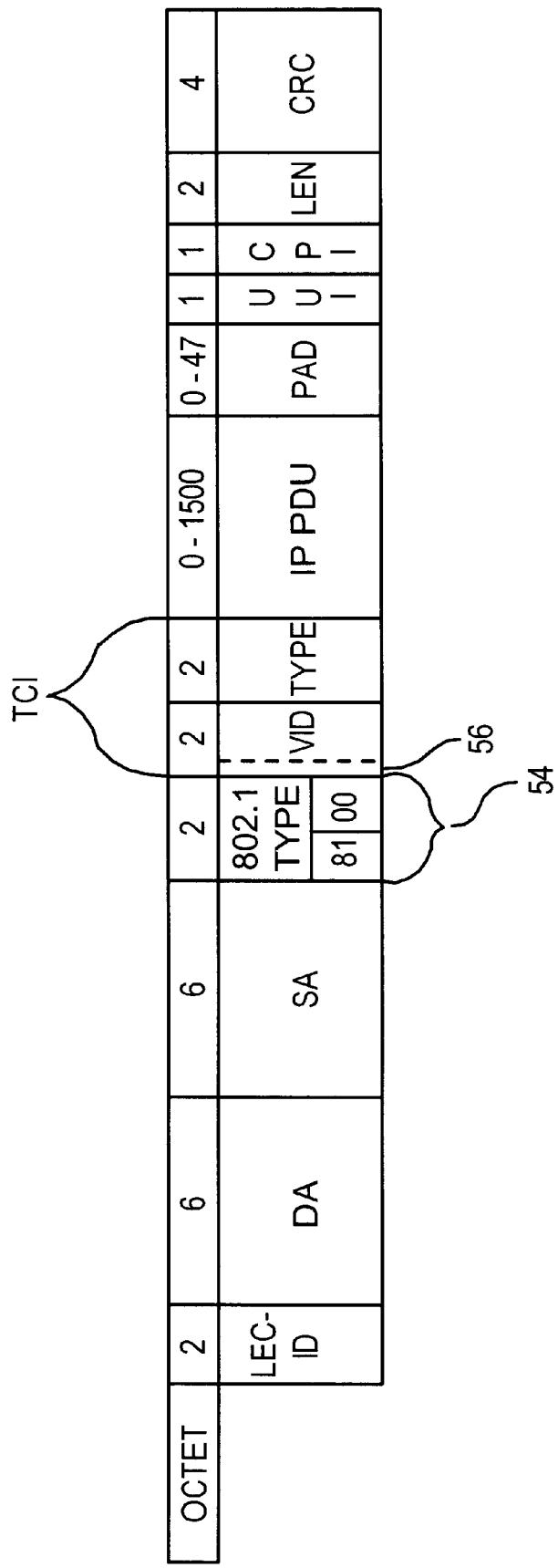
FIG. 4 is a simplified conceptual illustration of a non-ATM protocol frame adapted for transmission via an ATM network and useful in understanding the method of FIG. 3.

Additional reference is now made to FIG. 3, which is a simplified flowchart illustration of a method of operation of the ATM switch of FIG. 2, operative in accordance with a preferred embodiment of the present invention, and FIG. 4, which is a simplified conceptual illustration of a non-ATM frame adapted for transmission via an ATM network and useful in understanding the method of FIG. 3. In the example shown in FIGS. 3 and 4, an 802.1Q protocol frame is formatted for transmission over an ATM network using LANE 1.0 and AAL 5. It is appreciated, however, that obvious adaptations of the method may be made by persons of ordinary skill in the art in order to process many different types of frames currently known in the art. In the method of FIG. 3 an incoming cell is received in sequence. Having determined that LANE 1.0 and AAL 5 are operative for transmissions via the current VCC, table 52 is consulted for the predetermined location of the non-ATM protocol identifier within the ATM PDU. The payload of the cell is then inspected at the predetermined location, such as at octets 15 and 16 in the example shown in FIG. 4 at reference numeral 54 (where the first octet is indexed at 1) to identify the non-ATM PDU protocol identifier which is included in the payload. If the predetermined location reveals a known non-ATM PDU protocol identifier, such as the hexadecimal value×8100 at octets 15 and 16 identifying the frame as being an 802.1Q protocol frame, processing continues with the non-ATM protocol service identifier being determined by inspecting the payload further at yet another predetermined location in accordance with table 52, such as the three high-order bits of octet 17 comprising part of the TCI field in the example shown in FIG. 4 at reference numeral 56.

Once the non-ATM protocol type and the protocol service identifier are known for the frame, table 50 is then consulted for the corresponding CLP override and DLP values. These values are then used instead of the corresponding attribute fields from table 48 in FIG. 2, but only to the extent that the overall QoS contract is maintained. For example, in accordance with standard ATM protocols, if the CLP bit is currently set (i.e., CLP=1, the cell may be dropped), it may not be cleared. The cell is then buffered in the appropriate queue 44 in accordance with the DLP override value from table 50, and the CLP bit in its header is set if the CLP override value obtained from table 50 is also set. Processing continues until the end of the frame is detected, such as is indicated by the PTI field in an AAL 5-formatted frame.

When a new frame is detected its frame type is again determined as above, and either the appropriate override values from table 50 are used where applicable, or the default values from table 48 are used where no override values apply, such as if the specific frame type is not found in table 50 or if using override values would violate the QoS contract.

The method of FIG. 3 may be implemented for a single protocol frame type on a single VCC, for two or more different protocol frame types on a single VCC, for a single protocol frame type on two or more VCCs, and/or for two or more different protocol frame types on two or more VCCs. Where two or more VCCs are served, the method of FIG. 3 may be discriminately applied to one VCC and not to another.

It is appreciated that while the embodiment described hereinabove with reference to FIGS. 2 and 3 teaches the maintenance of an LSP and the dynamic adjustment thereof with respect to queue priority and service based on a non-ATM protocol service parameter, any aspect of the LSP of switch 40 may be similarly adjusted provided that the QoS contract is upheld Furthermore, while the method of FIG. 3 is particularly suited to the processing of an 802.1Q protocol frame encapsulated in a non-multiplexed LANE 1.0 fame using AAL 5, it is appreciated that the method may be adapted by one of ordinary skill for use with any known non-ATM protocol frame, any other ATM protocol frame, or any other AAL type that may be adapted for transmission via an ATM network.

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the trite spirit and scope of the invention.

What is claimed is:

1. A method for adjusting an ATM switch local service policy based on a non-ATM protocol service parameter, the method comprising the steps of:
    a) inspecting the payload of an ATM PDU received at a switch along at least one VCC to identify a non-ATM PDU protocol identifier included in said payload;
    b) inspecting said payload to identify a non-ATM PDU service identifier associated with said non-ATM PDU protocol identifier; and
    c) selectively adjusting a local service policy attribute within said switch for said at least one VCC based on said non-ATM PDU service identifier in accordance with an adjustment value in predefined association with said non-ATM PDU protocol identifier and said non-ATM PDU service identifier.

2. A method according to claim 1 wherein said ATM PDU is an AAL PDU.

3. A method according to claim 2 and further comprising the step of d) identifying a first cell in said AAL PDU and thereafter performing steps a)–c).

4. A method according to claim 3 wherein steps a)–d) are performed for at least two non-ATM PDUs on said VCC, wherein said non-ATM PDUs are of different protocol types.

5. A method according to claim 3 wherein said at least one VCC comprises at least two VCCs, and wherein steps a)–d) are performed for at least one non-ATM PDU on each of said at least two VCCs.

6. A method according to claim 2 wherein said AAL PDU is of an AAL, type selected from the group consisting of: type 1, type 2, type 3/4, and type 5.

7. A method according to claim 1 and further comprising maintaining a predefined association between a specific non-ATM PDU protocol identifier and the position of said non-ATM PDU service identifier in said payload.

8. Apparatus for adjusting an ATM switch local service policy based on a non-ATM protocol service parameter comprising:
    means for inspecting the payload of an ATM PDU received at a switch along at least one VCC to identify a non-ATM PDU protocol identifier included in said payload;
    means for inspecting said payload to identify a non-ATM PDU service identifier associated with said non-ATM PDU protocol identifier; and
    means for selectively adjusting a local service policy attribute within said switch for said at least one VCC based on said non-ATM PDU service identifier in accordance with an adjustment value in predefined association with said non-ATM PDU protocol identifier and said non-ATM PDU service identifier.

9. Apparatus according to claim 8 wherein said ATM PDU is an AAL PDU.

10. Apparatus according to claim 9 and further comprising means for identifying a first cell in said AAL PDU.

11. Apparatus according to claim 10 wherein any of said means are adapted for use with at least two non-ATM PDUs on said VCC, wherein said non-ATM PDUs are of different protocol types.

12. Apparatus according to claim 10 wherein said at least one VCC comprises at least two VCCs, and wherein any of said means are adapted for use with at least one non-ATM PDU on each of said at least two VCCs.

13. Apparatus according to claim 9 wherein said AAL PDU is of an AAL type selected from the group consisting of: type 1, type 2, type 3/4, and type 5.

14. Apparatus according to claim 8 and further comprising maintaining a predefined association between a specific non-ATM PDU protocol identifier and the position of said non-ATM PDU service identifier in said payload.

* * * * *